(12) United States Patent
Vijayan et al.

(10) Patent No.: US 8,959,588 B1
(45) Date of Patent: Feb. 17, 2015

(54) SYSTEMS AND METHODS FOR MITIGATING REMOTE AUTHENTICATION SERVICE UNAVAILABILITY

(75) Inventors: Sandesh Puthenpurayil Vijayan, Karnataka (IN); Srinath Venkataramani, Bangalore (IN); Vadiraj Kulkarni, Karnataka (IN)

(73) Assignee: Symantec Corporation, Mountain View, CA (US)

( * ) Notice: Subject to any disclaimer, the term of this patent is extended or adjusted under 35 U.S.C. 154(b) by 122 days.

(21) Appl. No.: 13/459,046

(22) Filed: Apr. 27, 2012

(51) Int. Cl.
*H04L 29/00* (2006.01)
*H04W 8/00* (2009.01)
*H04L 9/32* (2006.01)

(52) U.S. Cl.
CPC .. *H04W 8/00* (2013.01); *H04L 9/32* (2013.01)
USPC .......................................................... 726/3

(58) Field of Classification Search
CPC ......... H04W 4/001; H04W 4/02; H04W 8/00; H04L 9/32; H04L 8/00
See application file for complete search history.

(56) References Cited

U.S. PATENT DOCUMENTS

| 7,512,677 B2 * | 3/2009 | Cox et al. ...................... 709/223 |
| 2011/0099616 A1 * | 4/2011 | Mazur et al. ...................... 726/7 |
| 2012/0254613 A1 * | 10/2012 | Nimura et al. ................. 713/168 |

* cited by examiner

*Primary Examiner* — Brandon Hoffman
*Assistant Examiner* — Michael D Anderson
(74) *Attorney, Agent, or Firm* — ALG Intellectual Property, LLC

(57) ABSTRACT

A computer-implemented method for mitigating remote authentication service unavailability. The method may include 1) monitoring an availability of a remote authentication service that an authentication system, while performing multi-factor authentications, uses to validate an authentication factor of the multi-factor authentications, 2) while monitoring the availability of the remote authentication service, detecting that the remote authentication service is unavailable, and 3) in response to detecting that the remote authentication service is unavailable, causing the authentication system to bypass the authentication factor such that the authentication system can perform authentications while the remote authentication service is unavailable. Various other methods, systems, and computer-readable media are also disclosed.

20 Claims, 6 Drawing Sheets

SYSTEMS AND METHODS FOR MITIGATING REMOTE AUTHENTICATION SERVICE UNAVAILABILITY

BACKGROUND

Enterprises use various methods to control access to corporate systems, information, and network resources. In general, a typical access-control system performs two primary functions: an authentication function and an authorization function. For example, prior to providing a user access to a resource (e.g., a computing device, an application, or a website) an access-control system may first request identification information (e.g., a username, a password, etc.) from the user that the access-control system can use to positively identify the user. If the identity of the user can be established using the provided identification information, the access-control system may then determine whether the user has permission to access the resource and if so, may allow the user to access the resource.

Some factors that contribute to the level of security provided by an access-control system may include the type and quantity of identification information that the access-control system requires a user to provide in order to be authenticated. Examples of the types of identification information that an access-control system may require may include identification information that the user knows (e.g., a username, a password, or a personal identification number), identification information that the user has (e.g., a smartcard or a one-time password generated using a hardware token or smartphone), and/or identification information that the user is (e.g., a biometric characteristic of the user such as a fingerprint). In order to increase the level of security provided by its access-control system, an enterprise may implement an access-control system that authenticates users using an authentication method referred to as multi-factor authentication that uses identification information from more than one authentication factor to authenticate users.

Unfortunately, implementing a multi-factor authentication system may be complex and costly. As a result, enterprises may utilize remote authentication services (e.g. a cloud-based authentication service) to perform a portion of a multi-factor authentication. For example, an enterprise that implements an access-control system that performs multi-factor authentication using a username, a password, and a one-time password may validate the username and password itself and may utilize a remote authentication service to validate the one-time password.

As a result of utilizing a remote authentication service to perform multi-factor authentication, an access-control system may require an active network connection with the remote authentication service in order to perform multi-factor authentications, and any disruption to this connection (e.g., caused by a network outage) and/or any downtime of the remote authentication service may cause the remote authentication service to be unavailable to the access-control system, which may result in the failure of authentications performed by the access-control system. Accordingly, the instant disclosure addresses a need for additional and improved systems and methods for mitigating remote authentication service unavailability.

SUMMARY

As will be described in greater detail below, the instant disclosure generally relates to systems and methods for mitigating remote authentication service unavailability by causing an authentication system to switch from performing authentications by using a remote authentication service to bypassing the remote authentication service whenever the remote authentication service becomes unavailable. In one example, a computer-implemented method for performing such a task may include 1) monitoring an availability of a remote authentication service that an authentication system, while performing multi-factor authentications, uses to validate an authentication factor of the multi-factor authentications, 2) while monitoring the availability of the remote authentication service, detecting that the remote authentication service is unavailable, and 3) in response to detecting that the remote authentication service is unavailable, causing the authentication system to bypass the authentication factor such that the authentication system can perform authentications while the remote authentication service is unavailable. In one example, the remote authentication service may represent and/or include a cloud-based web service.

In some embodiments, the method may also include 1) while the authentication system bypasses the authentication factor, detecting that the remote authentication service has become available and 2) in response to detecting that the remote authentication service has become available, causing the authentication system to validate the authentication factor using the remote authentication service. In one example, the step of detecting that the remote authentication service has become available may include determining that the remote authentication service has been available for a predetermined amount of time.

In other embodiments, the method may also include causing, after a predetermined amount of time has passed since the authentication system began to bypass the authentication factor, the authentication system to validate the authentication factor using the remote authentication service such that the authentication system is unable to perform authentications while the remote authentication service is still unavailable.

In certain embodiments, the method may further include notifying, upon causing the authentication system to validate the authentication factor, an administrator of the authentication system that 1) the authentication system has begun validating the authentication factor and/or 2) the remote authentication service remains unavailable.

In at least one embodiment, the step of monitoring the availability of the remote authentication service may include monitoring communications between the authentication system and the remote authentication service, and the step of detecting that the remote authentication service is unavailable may include determining that the authentication system cannot communicate with the remote authentication service.

In some embodiments, the step of determining that the authentication system cannot communicate with the remote authentication service may include determining 1) that the remote authentication service is unreachable, 2) that the remote authentication service is down, 3) that a connection between the authentication system and the remote authentication service cannot be established, and/or 4) that a connection between the authentication system and the remote authentication service has been disrupted.

In other embodiments, the method may also include notifying, in response to detecting that the remote authentication service is unavailable, an administrator of the authentication system that the remote authentication service is unavailable.

In at least one embodiment, the step of detecting that the remote authentication service is unavailable may include determining that the remote authentication service has been unavailable for a predetermined amount of time.

In one embodiment, a system for implementing the above-described method may include 1) a monitoring module programmed to monitor an availability of a remote authentication service that an authentication system, while performing multi-factor authentications, uses to validate an authentication factor of the multi-factor authentications, 2) a detection module programmed to, while monitoring the availability of the remote authentication service, detect that the remote authentication service is unavailable, and 3) a bypass module programmed to, in response to detecting that the remote authentication service is unavailable, cause the authentication system to bypass the authentication factor such that the authentication system can perform authentications while the remote authentication service is unavailable. The system may additionally include 1) a notification module programmed to notify an administrator of the authentication system of information relating to the authentication system and/or the remote authentication service and 2) at least one processor configured to execute the monitoring module, the detection module, the bypass module, and the notification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) monitor an availability of a remote authentication service that an authentication system, while performing multi-factor authentications, uses to validate an authentication factor of the multi-factor authentications, 2) while monitoring the availability of the remote authentication service, detect that the remote authentication service is unavailable, and 3) in response to detecting that the remote authentication service is unavailable, cause the authentication system to bypass the authentication factor such that the authentication system can perform authentications while the remote authentication service is unavailable.

As will be explained in greater detail below, by causing an authentication system to switch from using a method of performing authentications that uses a remote authentication service to one that does not whenever the remote authentication service becomes unavailable, the systems and methods described herein may ensure that the authentication system is able to continue to perform authentications even though the remote authentication service has become unavailable. Additionally, in some examples, by ensuring that the authentication system can continue to perform authentications while the remote authentication service is unavailable, these systems and methods may enable users to continue to access critical systems, information, and network resources, thereby reducing productivity losses that may have otherwise resulted. Furthermore, by providing notice to an administrator of the authentication system when the remote authentication service becomes unavailable, these systems and methods may also allow the administrator to remedy the problem causing the remote authentication service's unavailability.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
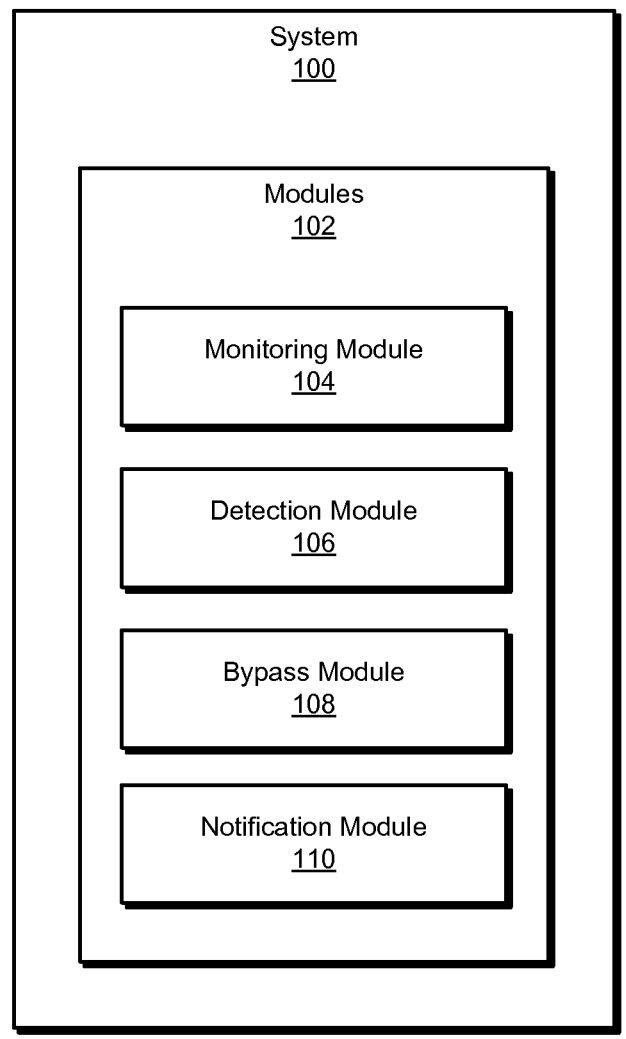
FIG. 1 is a block diagram of an exemplary system for mitigating remote authentication service unavailability.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
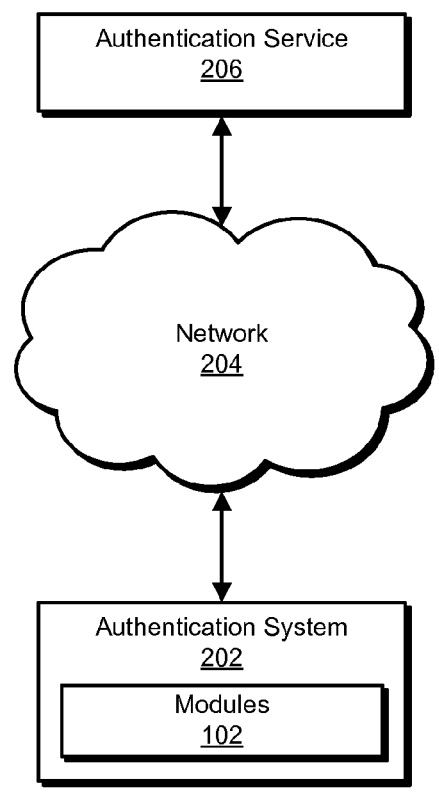
FIG. 2 is a block diagram of an exemplary system for mitigating remote authentication service unavailability.

The following will provide, with reference to FIGS. 1-2, detailed descriptions of exemplary systems for mitigating remote authentication service unavailability. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for mitigating remote authentication service unavailability. As illustrated in this figure, exemplary system 100 may include one or more modules 102 for performing one or more tasks. For example, and as will be explained in greater detail below, exemplary system 100 may include a monitoring module 104 programmed to monitor an availability of a remote authentication service that an authentication system uses to validate an authentication factor. Exemplary system 100 may also include a detection module 106 programmed to detect that the remote authentication service is unavailable.

In addition, and as will be described in greater detail below, exemplary system 100 may include a bypass module 108 programmed to cause the authentication system to bypass the authentication factor in response to detecting that the remote authentication service is unavailable such that the authentication system can continue to perform authentications while the remote authentication service is unavailable. Exemplary system 100 may also include a notification module 110 programmed to notify an administrator of the authentication system of information relating to the authentication system and/or the remote authentication service (e.g., information that states that the remote authentication service is unavailable or has become available). Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., authentication system 202 and/or remote authentication service 206), computing system 510 in FIG. 5, and/or portions of exemplary network architecture 600 in FIG. 6. In one example, one or more of modules 102 in FIG. 1 may represent a software application, program, or service running on a computing device that performs authentications on the computing device. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include an authentication system 202 in communication with a remote authentication service 206 via a network 204.

In one embodiment, one or more of modules 102 from FIG. 1 may, when executed by at least one processor of authentication system 202 and/or remote authentication service 206, enable authentication system 202 and/or remote authentication service 206 to mitigate remote authentication service unavailability. For example, and as will be described in greater detail below, one or more of modules 102 may cause authentication system 202 to 1) monitor an availability of remote authentication service 206 that authentication system 202 may use to validate an authentication factor of the multi-factor authentications authentication system 202 performs, 2) while monitoring the availability of remote authentication service 206, detect that remote authentication service 206 is unavailable, and 3) in response to detecting that remote authentication service 206 is unavailable, cause authentication system 202 to bypass the authentication factor such that authentication system 202 can perform authentications while remote authentication service 206 is unavailable.

Authentication system 202 generally represents any type or form of computing device capable of reading computer-executable instructions and/or performing authentications. Examples of authentication system 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device. In one example, authentication system 202 may represent a portion of an access-control system. For example, authentication system 202 may include one or more authentication servers (e.g., RADIUS servers) that perform authentications for one or more clients.

Remote authentication service 206 generally represents any type or form of computing device that is capable of reading computer-executable instructions and/or validating an authentication factor used in multi-factor authentications. Examples of remote authentication service 206 include, without limitation, application servers and database servers configured to provide various database services and/or run certain software applications. In one example, remote authentication service 206 may represent a cloud-based web service (e.g., a software-as-a-service or a platform-as-a-service system).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between authentication system 202 and remote authentication service 206.

Figure 3:
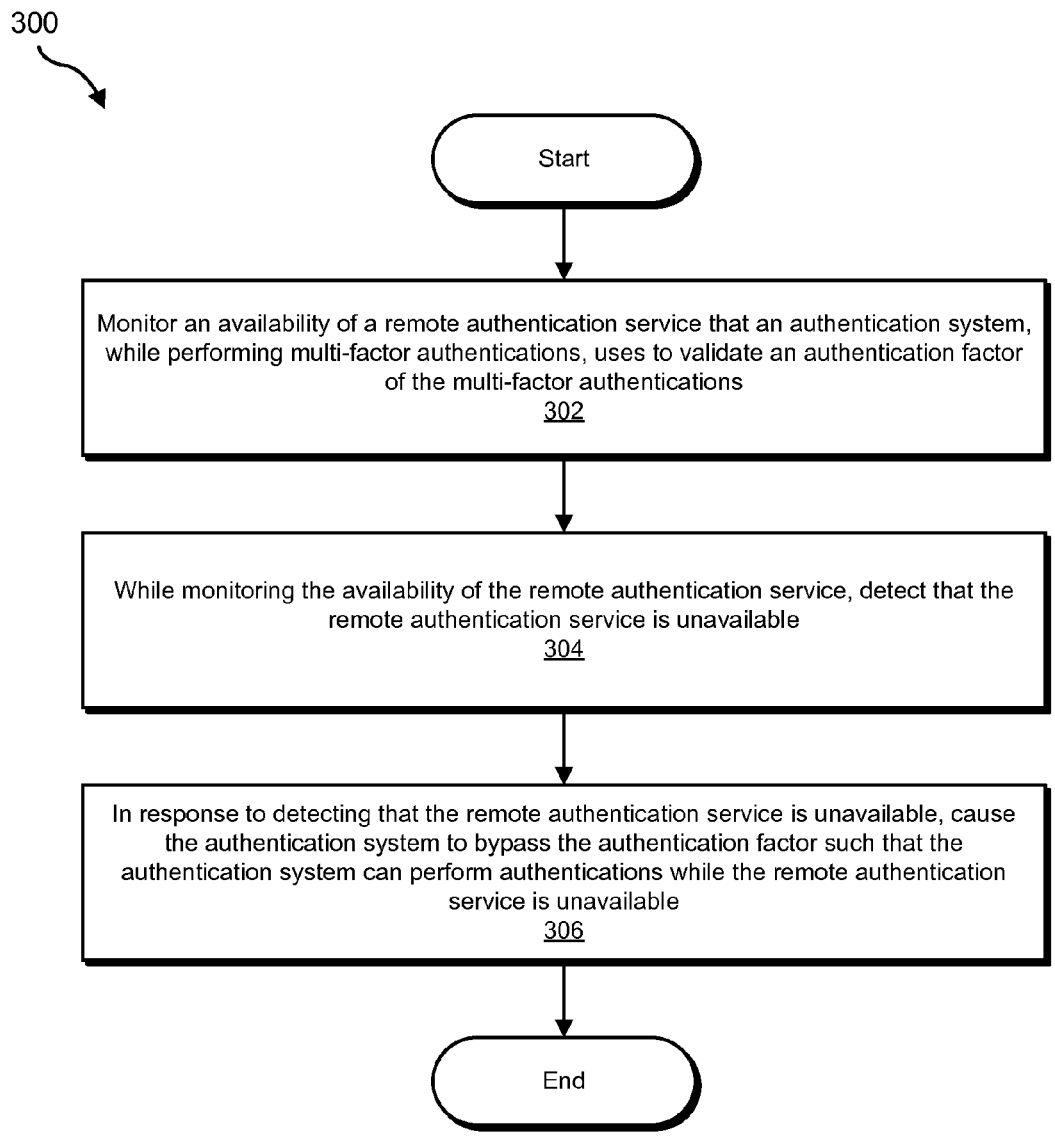
FIG. 3 is a flow diagram of an exemplary method for mitigating remote authentication service unavailability.

FIG. 3 is a flow diagram of an exemplary computer-implemented method 300 for mitigating remote authentication service unavailability. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302, one or more of the systems described herein may monitor an availability of a remote authentication service that an authentication system, while performing multi-factor authentications, uses to validate an authentication factor of the multi-factor authentications. For example, at step 302, monitoring module 104 may, as part of authentication system 202 in FIG. 2, monitor an availability of remote authentication service 206 that authentication system 202 uses to validate an authentication factor of the multi-factor authentications that it performs.

As used herein, the term "remote authentication service" may generally refer to any system or service that assists an authentication system in performing authentications. For example, a remote authentication service may refer to a system or service that is configured to validate an authentication factor for the authentication system and that is accessible to the authentication system over a network. In one example, a remote authentication service may refer to a cloud-based web service (e.g., a software-as-a-service or a platform-as-a-service system) that is accessible over the Internet. In another example, a remote authentication service may refer to a system or service accessible to the authentication system over an intranet (e.g., a corporate intranet).

The term "authentication system," as used herein, may generally refer to any system that performs user authentications. For example, an authentication system may perform user authentications as part of an access-control system. In general, an authentication system may authenticate a user by requesting that the user provide identification information that the authentication system may use to verify the user's identity. In order to perform authentications, an authentication system may require that a user provide identification information from one or more authentication factors (e.g., categories of identification information) such as identification information that the user knows (e.g., a username, a password, a personal identification number, or a challenge question), identification information that the user has (e.g., a smartcard or a one-time password generated using a hardware token or smartphone), and/or identification information that the user is (e.g., a biometric characteristic of the user such as a fingerprint).

In some examples, an authentication system may authenticate users using an authentication method referred to as multi-factor authentication. As used herein, the term "multi-factor authentication" may generally refer to an authentication method that uses identification information from more than one authentication factor (e.g., more than one of the categories of identification information mentioned above) to authenticate users. For example, an authentication method that uses a username, a password, and a one-time password to authenticate users may be considered a form of multi-factor authentication.

In at least one example, an authentication factor may refer to any single instance of identification information regardless of the category to which it belongs. In this example, the term multi-factor authentications may refer to a strong authentication method that uses two or more instances of identification information to perform authentications. For example, an authentication system that uses a username and two passwords to authenticate users may be considered a form of multi-factor authentication.

An authentication system may utilize a remote authentication service to perform a portion of multi-factor authentications. For example, an authentication system that requires a user to provide a username, a password, and a one-time password may be configured to validate the username and password itself and to use a remote authentication-service provider to validate the one-time password. In one example, the authentication system may use the remote authentication service to validate the authentication factor by transmitting the authentication factor to the remote authentication service and by receiving, from the remote authentication service, a response that indicates that the authentication factor is either valid or invalid. In other examples, the authentication system may use the remote authentication service to validate the authentication factor by using information received from the remote authentication service that allows the authentication system to determine whether an authentication factor is either valid or invalid.

An authentication system that uses a remote authentication service may require an active network connection with the remote authentication service in order to perform authentications. For this reason, any disruption to this connection (e.g., caused by a network outage) and/or any downtime of the remote authentication service may cause the remote authentication service to be unavailable to the authentication system and may result in the failure of authentications performed by the authentication system.

Returning to FIG. 3, the systems described herein may perform step 302 in a variety of ways. For example, monitoring module 104 may monitor the availability of the remote authentication service by monitoring communications between the authentication system and the remote authentication service and/or by monitoring a network connection between the authentication system and the remote authentication service. Monitoring module 104 may monitor the availability of the remote authentication service continually and/or at periodic intervals of time.

In one example, monitoring module 104 may monitor any or all communications between the authentication system and the remote authentication service that relate to authentication-factor validations. For example, monitoring module 104 may monitor validation requests sent to the remote authentication service by the authentication system and corresponding responses received from the remote authentication service. If the authentication system makes a request for a validation and does not receive a response from the remote authentication service the remote authentication service may be considered unavailable.

In another example, monitoring module 104 may monitor the availability of the remote authentication service by attempting to communicate with the remote authentication service. For example, monitoring module 104 may ping the remote authentication service in order to determine whether the remote authentication service is reachable. In one example, monitoring module 104 may send an Internet Control Message Protocol (ICMP) echo request to the remote authentication service and may monitor ICMP responses received from the remote authentication service. The remote authentication service may be considered unavailable to the authentication system if the remote authentication service does not respond to the ICMP echo requests sent to it by monitoring module 104.

In other examples, monitoring module 104 may monitor a status of the remote authentication service in order to determine whether the remote authentication service is down. For example, monitoring module 104 may periodically query the remote authentication service for a status and/or may monitor status updates sent by the remote authentication service (e.g., a push service that provides the remote authentication service's status).

In addition, or as an alternative to monitoring communications between the authentication system and the remote authentication service, monitoring module 104 may also monitor a network connection between the authentication system and the remote authentication service that the authentication system and the remote authentication service use to communicate. In one example, monitoring module 104 may monitor a network connection between the authentication system and the remote authentication service by attempting to establish a network connection with the remote authentication service. In one example, monitoring module 104 may attempt to establish a connection with the remote authentication service by attempting to negotiate a Secure Sockets Layer (SSL) connection with the remote authentication service. If monitoring module 104 is unable to negotiate a SSL connection with the remote authentication service, the remote authentication service may be considered unavailable to the authentication system (perhaps because a certificate that was used to negotiate the SSL connection has expired).

At step 304, in FIG. 3, one or more of the systems described herein may, while monitoring the availability of the remote authentication service, detect that the remote authentication service is unavailable. For example, at step 304, detection module 106 may, as part of authentication system 202 in FIG. 2, detect that remote authentication service 206 is unavailable.

The systems described herein may perform step 304 in a variety of ways. For example, detection module 106 may detect that the remote authentication service is unavailable by determining that the authentication system is unable to use the remote authentication service to validate an authentication factor. Detection module 106 may determine that the authentication system is unable to use the remote authentication service by determining that 1) the authentication system cannot communicate with the remote authentication service, 2) the authentication system cannot establish a connection with the remote authentication service, and/or 3) the remote authentication service is down.

In one example, as monitoring module 104 monitors validation requests made by the authentication system and corresponding responses received from the remote authentication service (e.g., as part of step 302), detection module 106 may detect that the remote authentication service is unavailable by detecting that the authentication system did not receive a response to a request for a validation of an authentication factor from the remote authentication service.

In another example, as monitoring module 104 pings the remote authentication service in order to determine whether the remote authentication service is reachable (e.g., as part of step 302), detection module 106 may detect that the remote authentication service is unavailable by determining that no responses were received by monitoring module 104. For example, if monitoring module 104 sends an ICMP echo request to the remote authentication service and monitoring module 104 does not receive an ICMP response in return, detection module 106 may determine that the remote authentication service is unavailable.

As mentioned above, monitoring module 104 may also monitor a network connection between the authentication system and the remote authentication service. In these instances, detection module 106 may detect that the remote authentication service is unavailable by determining that a network connection between the authentication system and the remote authentication service cannot be established and/or by determining that the network connection between the authentication system and the remote authentication service has been disrupted. For example, while monitoring module 104 attempts to negotiate a SSL connection with the remote authentication service (e.g., as part of step 302), detection module 106 may detect that the remote authentication service is unavailable by determining that monitoring module 104 is unable to negotiate a SSL connection with the remote authentication service.

In another example, while monitoring module 104 monitors the status of the remote authentication service (e.g., as part of step 302), detection module 106 may detect that the remote authentication service is unavailable by determining that a status received from the remote authentication service indicates that the remote authentication service is down or otherwise unable to perform validations and/or by determining that no status was received from the remote authentication service.

In some instances, a determination that the remote authentication service is unavailable may be insignificant if the remote authentication service is unavailable for only a short period of time. For this and other reasons, in one example, detection module 106 may detect that the remote authentication service is unavailable by determining that the remote authentication service has been unavailable for a predetermined amount of time (e.g., an amount of time specified by an administrator of the authentication system). For example, detection module 106 may determine that the remote authentication service is unavailable if the remote authentication service has been unavailable for longer than one or more hours and/or one or more minutes.

At step 306, in FIG. 3, one or more of the systems described herein may, in response to detecting that the remote authentication service is unavailable, cause the authentication system to bypass the authentication factor such that the authentication system can perform authentications while the remote authentication service is unavailable. For example, at step 306, bypass module 108 may, as part of authentication system 202 in FIG. 2, cause authentication system 202 to bypass the authentication factor such that authentication system 202 can perform authentications while remote authentication service 206 is unavailable.

The systems described herein may perform step 306 in a variety of ways. For example, bypass module 108 may cause the authentication system to bypass the authentication factor by causing the authentication system to use a method of performing authentications that does not require the authentication factor and/or by causing the authentication system to validate the authentication factor using a method of validation that does not need the remote authentication service to be available. By causing the authentication system to bypass the authentication factor, bypass module 108 may ensure that the authentication system can continue to perform authentications while the remote authentication service is unavailable, which may allow users to continue to access critical systems, information, and network resources.

In one example, bypass module 108 may cause the authentication system to use a method of performing authentications that does not require the authentication factor by causing the authentication system to perform authentications using an authentication method that the authentication system is able to perform itself. For example, if an authentication system authenticates users by requiring that users provide a username, a password, and a one-time password, and the authentication system validates the username and password itself and uses the remote authentication service to validate the one-time password, bypass module 108 may cause the authentication system to authenticate users by requiring and then validating only the username and password.

In other examples, bypass module 108 may cause the authentication system to use a method of performing authentications that does not require the authentication factor by simply bypassing validation of the authentication factor. For example, if an authentication system authenticates users by requiring that users provide a username, a password, and a one-time password, and the authentication system validates the username and password itself and uses the remote authentication service to validate the one-time password, bypass module 108 may cause the authentication system to continue to require that a user provide the one-time password, but instead of validating the one-time password using the remote authentication service, bypass module 108 may cause the authentication to bypass the validation of the authentication factor. In this way, a user may be unaware that the authentication is bypassing the validation of the authentication factor.

In yet another example, bypass module 108 may cause the authentication system to validate the authentication factor using a method of validation that does not require the remote authentication service to be available. For example, an authentication system may be able to validate the authentication factor itself (perhaps for a limited amount of time) as a result of the remote authentication service having provided to the authentication system information that the authentication system may use to validate the authentication factor. In this example, bypass module 108 may cause the authentication system to use this information to validate the authentication factor while the remote authentication service is unavailable. Upon completion of step 306, exemplary method 300 in FIG. 3 may terminate.

Figure 4:
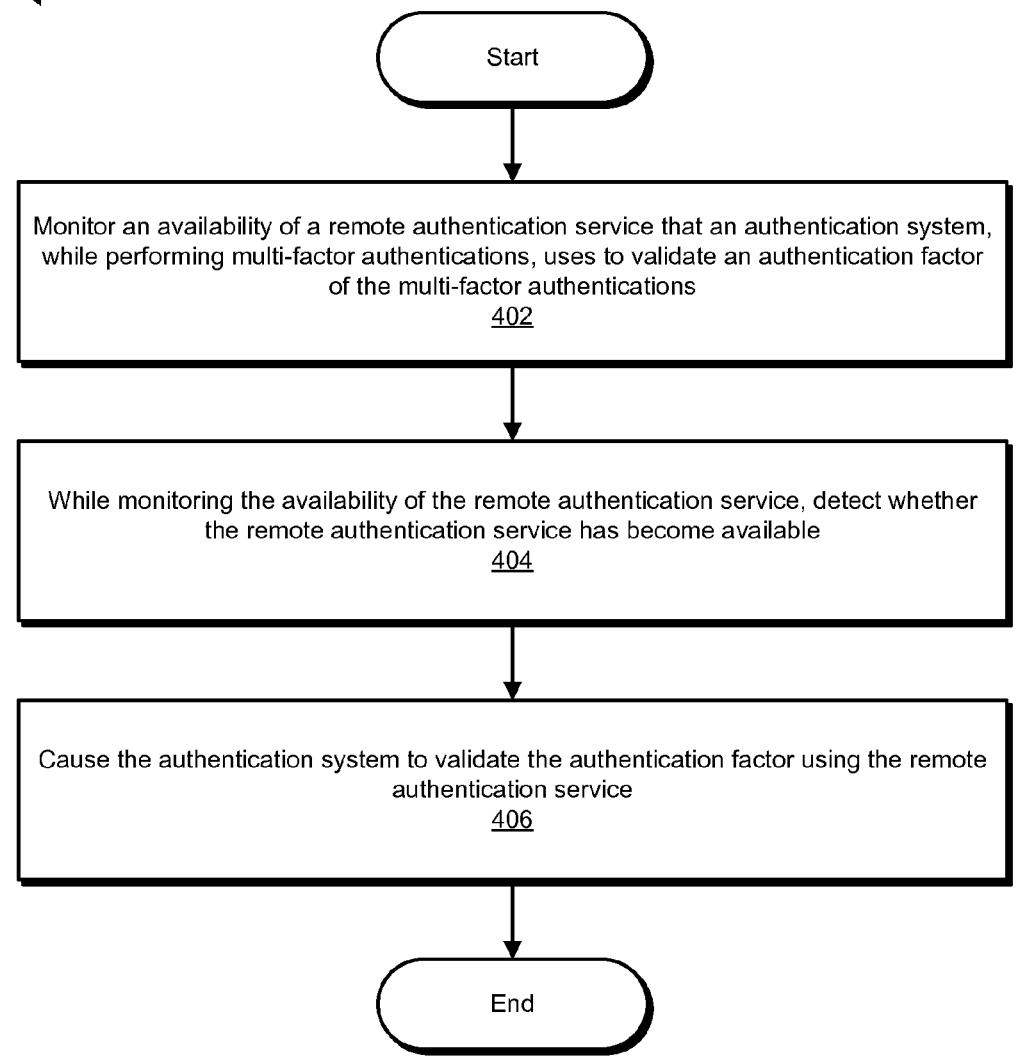
FIG. 4 is another flow diagram of an exemplary method for mitigating remote authentication service unavailability.

As detailed above, the systems and methods described herein may mitigate remote authentication service unavailability by causing an authentication system to bypass an authentication factor while a remote authentication service that is needed to validate the authentication factor is unavailable to the authentication system. The systems and methods described herein may also cause the authentication system to resume validating the authentication factor using the remote authentication service once the remote authentication service becomes available to the authentication system or after a predetermined amount of time. FIG. 4 is a flow diagram of an exemplary computer-implemented method 400 for performing such a task. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

At step 402, one or more of the systems described herein may monitor an availability of a remote authentication service that an authentication system, while performing multi-factor authentications, uses to validate an authentication factor of the multi-factor authentications. For example, at step 402, monitoring module 104 may, as part of authentication system 202 in FIG. 2, continue to monitor the availability of remote authentication service 206.

The systems described herein may perform step 402 in any suitable manner. Step 402 is similar to step 302 in FIG. 3, therefore, the discussion of step 302 may also apply to step 402. Monitoring module 104 may continue to monitor the availability of the remote authentication service for the purpose of 1) detecting when the remote authentication service becomes available and 2) causing the authentication system to resume validating the authentication factor soon after the remote authentication service becomes available.

At step 404, one or more of the systems described herein may, while monitoring the availability of the remote authentication service, detect whether the remote authentication service has become available. For example, at step 404 detection module 106 may, as part of authentication system 202 in FIG. 2, detect whether remote authentication service 206 has become available to authentication system 202.

The systems described herein may perform step 404 in any suitable manner. For example, detection module 106 may detect either that the remote authentication service has become available or that the remote authentication service remains unavailable. In the case that detection module 106 detects that the remote authentication service remains unavailable, step 404 is similar to step 304 in FIG. 3, therefore, the discussion of step 304 may also apply to step 404.

One reason why it may be important to detect that the remote authentication service remains unavailable is because, in some instances, causing an authentication system to bypass an authentication factor for a prolonged period of time may create a security risk by allowing a user to provide invalid identification information to the authentication system. For this and other reasons, in some examples, bypass module 108 may cause, as part of step 406, the authentication system to resume validating the authentication factor using the remote authentication service, which may result in the authentication system being unable to perform authentications until after the remote authentication service becomes available.

Additionally or alternatively, detection module 106 may detect that the remote authentication service has become available. For example, detection module 106 may detect that the authentication service is available by determining that the authentication system is again able to use the remote authentication service to validate an authentication factor. Detection module 106 may determine that the authentication system is again able to use the remote authentication service by determining 1) that the authentication system can communicate or has again communicated with the remote authentication service, 2) that the authentication system can establish or has again established a connection with the remote authentication service, and/or 3) that the remote authentication service is up.

In one example, as monitoring module 104 continues to monitor validation requests made by the authentication system and corresponding responses received from the remote authentication service (e.g., as part of step 402), detection module 106 may detect that the remote authentication service has become available by detecting that the authentication system has received a response to a request for a validation of an authentication factor from the remote authentication service.

In another example, as monitoring module 104 continues to ping the remote authentication service in order to determine whether the remote authentication service is reachable (e.g., as part of step 402), detection module 106 may detect that the remote authentication service has become available by determining that a response has been received by monitoring module 104. For example, if monitoring module 104 sends an ICMP echo request to the remote authentication service and monitoring module 104 receives an ICMP response in return, detection module 106 may determine that the remote authentication service has become available.

As mentioned above, monitoring module 104 may also monitor a network connection between the authentication system and the remote authentication service. In these instances, detection module 106 may detect that the remote authentication service has become available by determining that a network connection between the authentication system and the remote authentication service can be or has been established. For example, while monitoring module 104 continues to attempt to negotiate a SSL connection with the remote authentication service (e.g., as part of step 402), detection module 106 may detect that the remote authentication service has become available by determining that monitoring module 104 is able to negotiate a SSL connection with the remote authentication service.

In another example, while monitoring module 104 continues to monitor the status of the remote authentication service (e.g., as part of step 402), detection module 106 may detect that the remote authentication service has become available by determining that a status received from the remote authentication service indicates that the remote authentication service is up or otherwise able to perform validations.

In some instances, a determination that the remote authentication service has become available may be immaterial if the remote authentication service is available for only a short period of time. For this and other reasons, in one example, detection module 106 may detect that the remote authentication service has become available by determining that the remote authentication service has been available for a predetermined amount of time (e.g., a predetermined amount of time specified by an administrator of the authentication system).

At step 406, one or more of the systems described herein may cause the authentication system to validate the authentication factor using the remote authentication service. For example, at step 406, bypass module 108 may, as part of authentication system 202 in FIG. 2, cause authentication system 202 to resume validating the authentication factor using remote authentication service 206.

The systems described herein may perform step 406 in any suitable manner. For example, bypass module 108 may cause the authentication system to resume validating the authentication factor using the remote authentication service in the same or a similar manner to which the authentication system had been validating the authentication factor using the remote authentication service prior to the remote authentication service becoming unavailable (e.g., as described above in the description of step 302). Bypass module 108 may cause the authentication system to resume validating the authentication factor using the remote authentication service in response to detection module 106 detecting that either the remote authentication service has become available or that the remote authentication service remains unavailable. For example, bypass module 108 may cause the authentication system to resume validating the authentication factor using the remote authentication service even if the remote authentication service remains unavailable. Upon completion of step 406, exemplary method 400 in FIG. 4 may terminate.

In addition to the processes described in FIGS. 3 and 4, various additional and alternative steps may be performed by the systems described herein. For example, one or more of the systems described herein may provide, to an administrator of an authentication system, one or more notifications related to the availability of a remote authentication service that the authentication system uses to validate an authentication factor. These notifications may be provided to the administrator in order to assist the administrator in 1) identifying the reason why the remote authentication service is unavailable and/or 2) remedying the cause of the remote authentication service being unavailable.

In one example, in response to detecting that the remote authentication service is unavailable (e.g., as part of step 304 or step 404), notification module 110, in FIG. 1, may notify an administrator of the authentication system that the remote authentication service is unavailable. Similarly, in some examples, after bypass module 108 causes the authentication system to resume validating the authentication factor (e.g., as part of step 406), notification module 110 may notify an administrator of the authentication system that the authentication system has resumed validating the authentication factor and/or that the remote authentication service remains unavailable. Additionally or alternatively, notification module 110 may provide information to the administrator that explains the reason why the remote authentication service is unavailable.

Notification module 110 may provide notifications to the administrator of the authentication system in a variety of ways. For example, notification module 110 may provide the notifications to the administrator via email, instant message, text message, and/or any other suitable communication medium.

As explained above, by causing an authentication system to switch from using a method of performing authentications that requires a remote authentication service to one that does not whenever the remote authentication service becomes unavailable, the systems and methods described herein may ensure that the authentication system is able to continue to perform authentications even though the remote authentication service has become unavailable. Additionally, in some examples, by ensuring that the authentication system can continue to perform authentications while the remote authentication service is unavailable, these systems and methods may allow users to continue to access critical systems, information, and network resources, thereby reducing productivity losses that may have otherwise resulted. Furthermore, by providing notice to an administrator of the authentication system when the remote authentication service becomes unavailable, these systems and methods may also enable the administrator to remedy the cause of the remote authentication service's unavailability.

Figure 5:
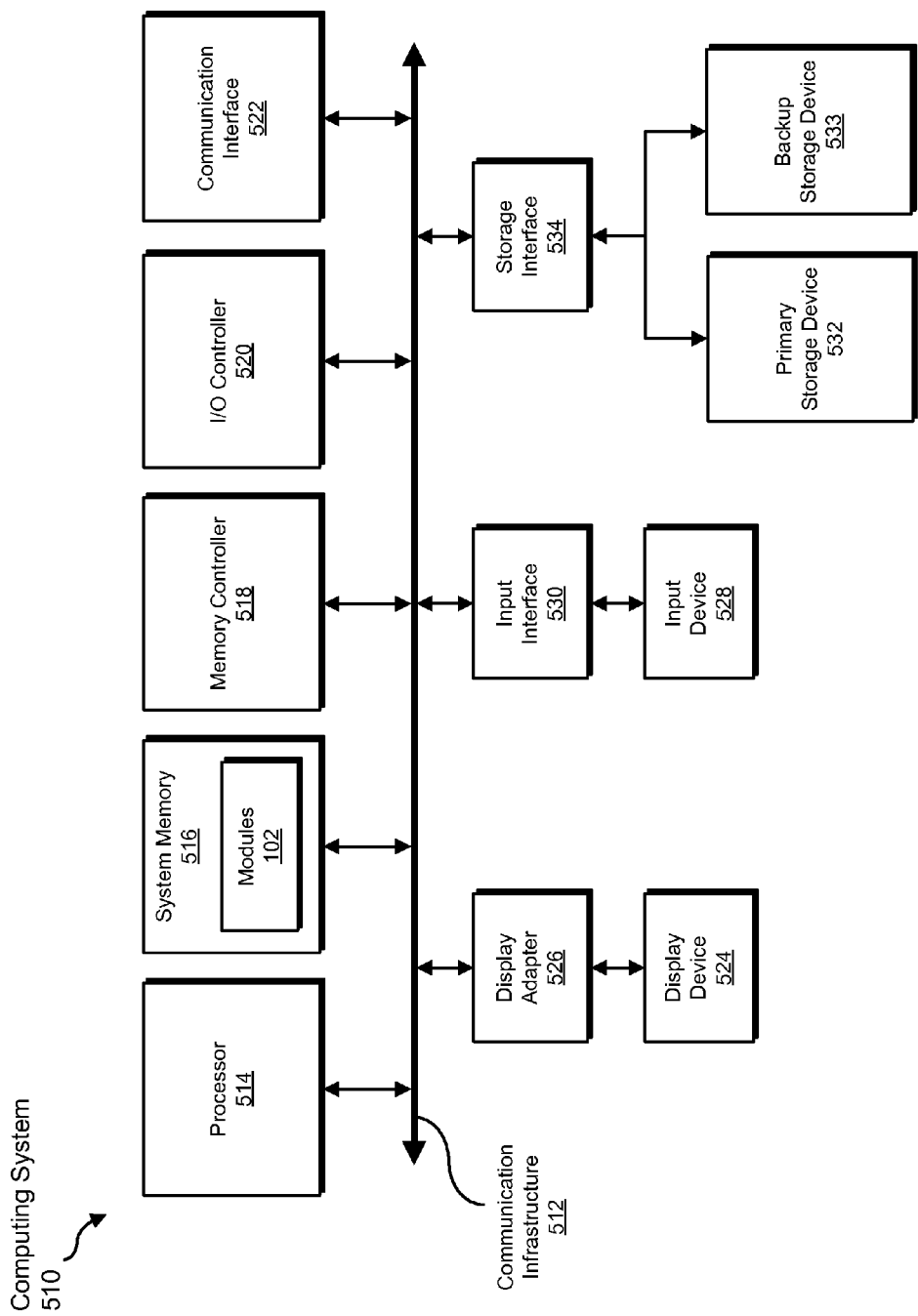
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the mitigating, monitoring, detecting, causing, determining, and notifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
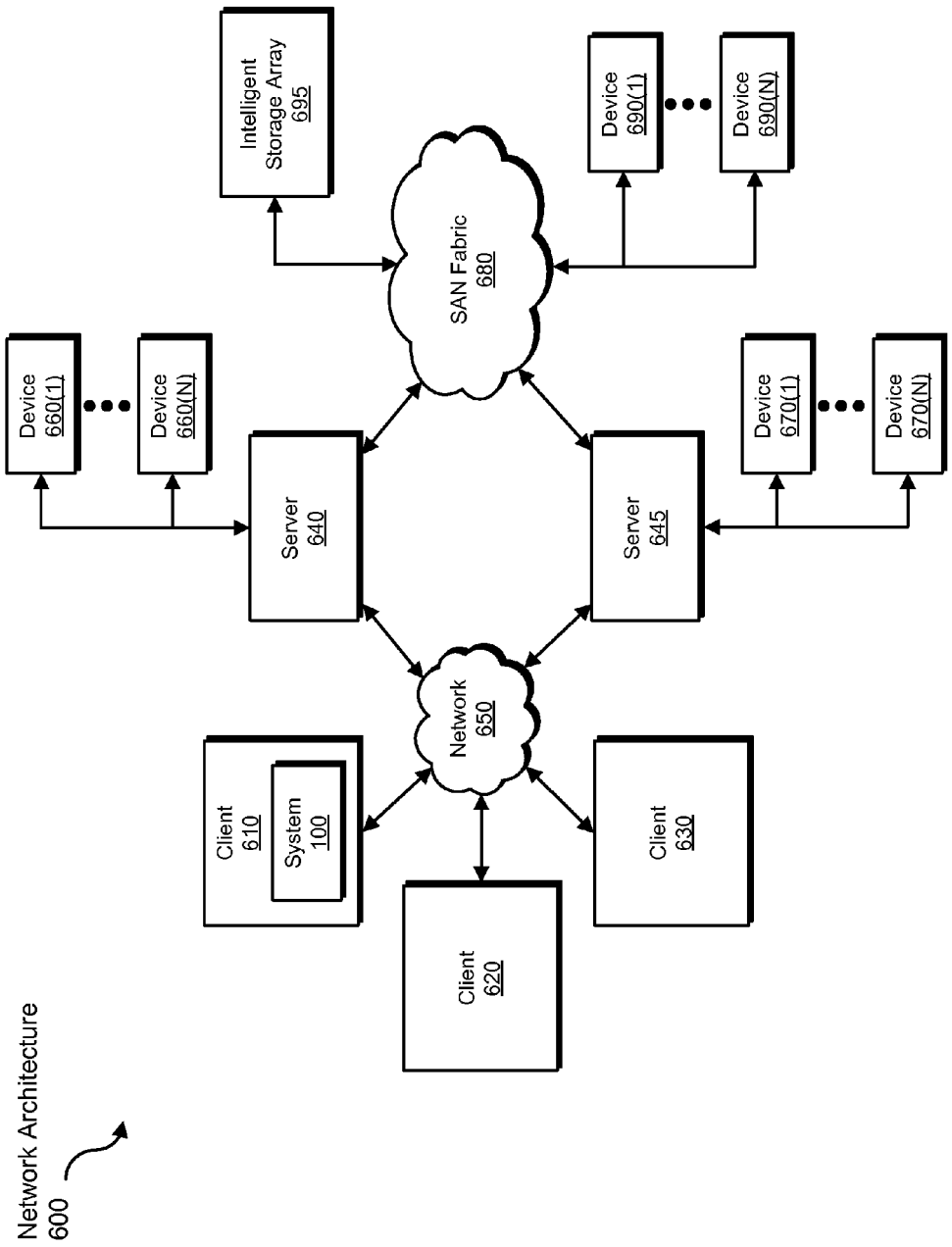
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the mitigating, monitoring, detecting, causing, determining, and notifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for mitigating remote authentication service unavailability.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of mitigating remote authentication service unavailability.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for mitigating remote authentication service unavailability, at least a portion of the method being performed by a computing device comprising at least one processor, the method comprising:

monitoring an availability of a remote authentication service that an authentication system uses to validate an authentication factor required to authenticate a user using multi-factor authentication, wherein:
the authentication factor comprises one of a plurality of authentication factors provided to the authentication system by the user;
the authentication system validates each of the plurality of authentication factors as part of authenticating the user using multi-factor authentication;

while monitoring the availability of the remote authentication service, detecting that the remote authentication service is unavailable;
in response to detecting that the remote authentication service is unavailable, causing the authentication system to bypass the authentication factor such that the authentication system can authenticate the user while the remote authentication service is unavailable by performing at least one of:
  causing the authentication system to authenticate the user without validating the authentication factor;
  causing the authentication system to validate the authentication factor using an alternative method of validation that does not require the remote authentication service to be available.

2. The method of claim 1, further comprising:
while the authentication system bypasses the authentication factor, detecting that the remote authentication service has become available;
in response to detecting that the remote authentication service has become available, causing the authentication system to validate the authentication factor using the remote authentication service.

3. The method of claim 1, wherein the plurality of authentication factors comprise at least two of:
identification information that the user knows;
identification information that the user has;
identification information that the user is.

4. The method of claim 1, further comprising causing, after a predetermined amount of time has passed since the authentication system began to bypass the authentication factor, the authentication system to validate the authentication factor using the remote authentication service such that the authentication system is unable to perform authentications while the remote authentication service is still unavailable.

5. The method of claim 4, further comprising notifying, upon causing the authentication system to validate the authentication factor, an administrator of the authentication system of at least one of:
the authentication system validating the authentication factor;
the remote authentication service remaining unavailable.

6. The method of claim 1, wherein:
monitoring the availability of the remote authentication service comprises monitoring communications between the authentication system and the remote authentication service;
detecting that the remote authentication service is unavailable comprises determining that the authentication system cannot communicate with the remote authentication service.

7. The method of claim 6, wherein determining that the authentication system cannot communicate with the remote authentication service comprises determining at least one of:
that the remote authentication service is unreachable;
that the remote authentication service is down;
that a connection between the authentication system and the remote authentication service cannot be established;
that a connection between the authentication system and the remote authentication service has been disrupted.

8. The method of claim 1, wherein the remote authentication service comprises a cloud-based web service.

9. The method of claim 1, further comprising notifying, in response to detecting that the remote authentication service is unavailable, an administrator of the authentication system that the remote authentication service is unavailable.

10. The method of claim 1, wherein the steps of monitoring and detecting are performed by the authentication system.

11. A system for mitigating remote authentication service unavailability, the system comprising:
a monitoring module programmed to monitor an availability of a remote authentication service an authentication system uses to validate an authentication factor required to authenticate a user using multi-factor authentication, wherein:
  the authentication factor comprises one of a plurality of authentication factors provided to the authentication system by the user;
  the authentication system validates each of the plurality of authentication factors as part of authenticating the user using multi-factor authentication;
a detection module programmed to, while monitoring the availability of the remote authentication service, detect that the remote authentication service is unavailable;
a bypass module programmed to, in response to detecting that the remote authentication service is unavailable, cause the authentication system to bypass the authentication factor such that the authentication system can authenticate the user while the remote authentication service is unavailable by performing at least one of:
  causing the authentication system to authenticate the user without validating the authentication factor;
  causing the authentication system to validate the authentication factor using an alternative method of validation that does not require the remote authentication service to be available;
at least one processor configured to execute the monitoring module, the detection module, and the bypass module.

12. The system of claim 11, wherein:
the detection module is further programmed to, while the authentication system bypasses the authentication factor, detect that the remote authentication service has become available;
the bypass module is further programmed to, in response to detecting that the remote authentication service has become available, cause the authentication system to validate the authentication factor using the remote authentication service.

13. The system of claim 12, wherein the detection module is programmed to detect that the remote authentication service has become available by determining that the remote authentication service has been available for a predetermined amount of time.

14. The system of claim 11, wherein the bypass module is further programmed to, after a predetermined amount of time has passed since the authentication system began to bypass the authentication factor, cause the authentication system to validate the authentication factor using the remote authentication service such that the authentication system is unable to perform authentications while the remote authentication service is still unavailable.

15. The system of claim 14, further comprising a notification module programmed to, upon causing the authentication system to validate the authentication factor, notify an administrator of the authentication system of at least one of:
the authentication system validating the authentication factor;
the remote authentication service remaining unavailable;
the remote authentication service becoming available.

16. The system of claim 11, wherein:
the monitoring module is programmed to monitor the availability of the remote authentication service by monitoring communications between the authentication system and the remote authentication service;

the detection module is programmed to detect that the remote authentication service is unavailable by determining that the authentication system cannot communicate with the remote authentication service.

17. The system of claim 16, wherein the detection module is programmed to determine that the authentication system cannot communicate with the remote authentication service by determining at least one of:

that the remote authentication service is unreachable;
that the remote authentication service is down;
that a connection between the authentication system and the remote authentication service cannot be established;
that a connection between the authentication system and the remote authentication service has been disrupted.

18. The system of claim 11, wherein the remote authentication service comprises a cloud-based web service.

19. The system of claim 11, further comprising a notification module programmed to, in response to detecting that the remote authentication service is unavailable, notify an administrator of the authentication system that the remote authentication service is unavailable.

20. A non-transitory computer-readable-storage medium comprising one or more computer-executable instructions that, when executed by at least one processor of a computing device, cause the computing device to:

monitor an availability of a remote authentication service that an authentication system uses to validate an authentication factor required to authenticate a user using multi-factor authentication, wherein:

the authentication factor comprises one of a plurality of authentication factors provided to the authentication system by the user;
the authentication system validates each of the plurality of authentication factors as part of authenticating the user using multi-factor authentication;

while monitoring the availability of the remote authentication service, detect that the remote authentication service is unavailable;

in response to detecting that the remote authentication service is unavailable, cause the authentication system to bypass the authentication factor such that the authentication system can authenticate the user while the remote authentication service is unavailable by performing at least one of:

causing the authentication system to authenticate the user without validating the authentication factor;
causing the authentication system to validate the authentication factor using an alternative method of validation that does not require the remote authentication service to be available.

* * * * *

UNITED STATES PATENT AND TRADEMARK OFFICE
CERTIFICATE OF CORRECTION

PATENT NO. : 8,959,588 B1
APPLICATION NO. : 13/459046
DATED : February 17, 2015
INVENTOR(S) : Sandesh Puthenpurayil Vijayan, Srinath Venkataramani and Vadiraj Kulkarni It is certified that error appears in the above-identified patent and that said Letters Patent is hereby corrected as shown below:

On the Title Page, at (75), the Inventors should read:
Sandesh Puthenpurayil Vijayan, Karnataka (IN); Srinath Venkataramani, Bangalore (IN); Vadiraj Kulkarni, Karnataka (IN)

In the Claims
Claim 11, at column 20, lines 5 to 6, should read:
a monitoring module programmed to monitor an availability of a remote authentication service that an authentication Signed and Sealed this
Twenty-fifth Day of August, 2015

Michelle K. Lee
*Director of the United States Patent and Trademark Office*